United States Patent
Reagle

(10) Patent No.: US 10,387,490 B2
(45) Date of Patent: Aug. 20, 2019

(54) VIDEO INSPECTOR

(71) Applicant: Disney Enterprises, Inc., Burbank, CA (US)

(72) Inventor: Stephanie M. Reagle, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 736 days.

(21) Appl. No.: 15/071,092

(22) Filed: Mar. 15, 2016

(65) Prior Publication Data

US 2017/0270204 A1    Sep. 21, 2017

(51) Int. Cl.
| G06F 16/00 | (2019.01) |
| G06F 16/735 | (2019.01) |
| G06F 16/71 | (2019.01) |
| G06F 16/738 | (2019.01) |
| G06F 16/2457 | (2019.01) |
| H04N 21/231 | (2011.01) |
| H04N 21/254 | (2011.01) |
| H04N 21/278 | (2011.01) |

(52) U.S. Cl.
CPC ...... *G06F 16/735* (2019.01); *G06F 16/24578* (2019.01); *G06F 16/71* (2019.01); *G06F 16/738* (2019.01); *H04N 21/231* (2013.01); *H04N 21/23113* (2013.01); *H04N 21/2541* (2013.01); *H04N 21/278* (2013.01)

(58) Field of Classification Search
None
See application file for complete search history.

(56) References Cited

U.S. PATENT DOCUMENTS

| 9,215,243 B2* | 12/2015 | Bommireddipalli ........................ H04L 63/1416 |
| 2013/0013583 A1* | 1/2013 | Yu ........................ G06F 17/3084 707/709 |
| 2013/0091580 A1* | 4/2013 | Maha ................ G06F 17/30867 726/26 |

\* cited by examiner

*Primary Examiner* — Anhtai V Tran
(74) *Attorney, Agent, or Firm* — Patterson + Sheridan, LLP

(57) ABSTRACT

Systems, methods, and computer program products to perform an operation comprising receiving a first set of search results including a first search result from a video service based on a first search string, extracting a set of attributes for the first search result based on a source code of the first set of search results, wherein the first search corresponds to a first video hosted on the video service, and upon determining that at least one attribute of the set of attributes for the first search result violates at least a threshold number of rules of a plurality of rules, storing an indication that the first video is a candidate for removal from the video service.

17 Claims, 5 Drawing Sheets

US 10,387,490 B2

VIDEO INSPECTOR

BACKGROUND

Field of the Disclosure

Embodiments disclosed herein relate to computer software, and more specifically, to computer software configured to identify online videos that infringe copyrights.

Description of the Related Art

Pirated content is often uploaded to online video services that can be viewed by users anywhere in the world. In many cases, an uploaded video (such as a movie or television show) may be removed from the video service due to a copyright violation, only to be re-uploaded again and again. Currently, content owners must manually identify infringing videos after sorting through pages and pages of search results, which is a slow and time consuming process.

SUMMARY

Embodiments disclosed herein include systems, methods, and computer program products to perform an operation comprising receiving a first set of search results including a first search result from a video service based on a first search string, extracting a set of attributes for the first search result based on a source code of the first set of search results, wherein the first search result corresponds to a first video hosted on the video service, and upon determining that at least one attribute of the set of attributes for the first search result violates at least a threshold number of rules of a plurality of rules, storing an indication that the first video is a candidate for removal from the video service.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments presented herein provide techniques to dynamically analyze videos posted on online video services to identify videos that may violate copyrights of the respective copyright holders. Generally, a user may provide one or more media assets as input to a video inspector. The video inspector may create, for each media asset, a search string that may reveal pirated content. For example, if the user provides the "nightly news" as an input media asset, the video inspector may create "nightly news full episodes" as a search string, and submit the search string to an online video service. The video inspector may then analyze the source code of one or more results pages returned by the online video service to extract metadata for each result in the results pages. The video inspector may then determine, based on one or more rules applied to each result, whether the video corresponding to the result is pirated. The video inspector may be software, hardware, or any combination thereof.

Figure 1:
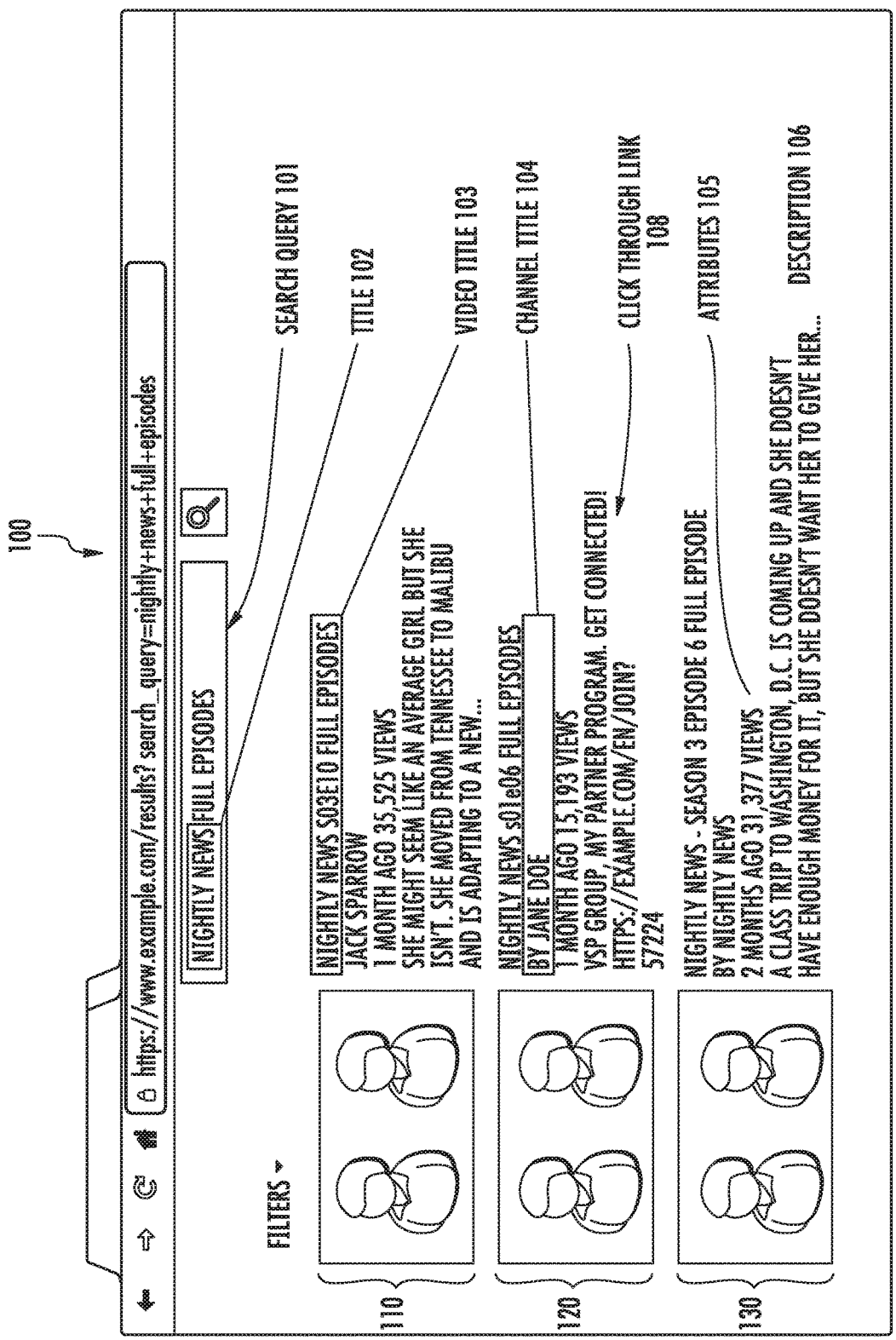
FIG. 1 illustrates an example graphical user interface used by a video inspector to identify pirated content, according to one embodiment.

FIG. 1 illustrates an example graphical user interface (GUI) 100 used by a video inspector application to identify pirated content, according to one embodiment. Generally, the GUI 100 is offered by a video service site. The GUI 100 allows a user to submit a search query 101, and provides a set of search results responsive to the query 101. As shown, the example query 101 is "nightly news full episodes" which corresponds to a title 102 of "nightly news." The title 102 corresponds to a media asset (or media title), such as a movie, television show, sporting event, or any other copyrighted video content. Generally, a user may provide one or more titles to the video inspector (e.g., through a GUI of the video inspector, or as part of a file provided to the video inspector as input). The video inspector may then create, for each media asset, a search query 101, and submit the query via the GUI 100. The search query 101 may include the title 102 and one or more additional terms that are conventionally associated with pirated content, such "full episode," "free," and the like. In response, the video service executes the query 101, and returns a set of search results corresponding to videos hosted on the video service.

As shown, the GUI 100 depicts three example search results, namely results 110, 120, and 130. For each search result 110, 120, 130, the GUI includes a video title 103 which is part of a hyperlink to a page corresponding to the respective search result, a channel title 104 which is part of a hyperlink to a "channel" where the video is hosted (or a user account that uploaded the video), a set of attributes 105, and a description 106. The example attributes 105 include an upload date and a counter for a number of views for the video. The description 106 is a text description of the corresponding video, such as a plot synopsis.

The video inspector may analyze the source code of the GUI 100 to extract the video title 103 (which may be the viewable text of a hyperlink which points to a network address of a page which includes the video), channel title 104, attributes 105, and description 106 for each search result 110, 120, and 130. The video inspector may analyze a predefined number of search result pages, which may be based on the media asset. For example, more pages may be searched for more popular content, while fewer pages may be searched for less popular content.

Although depicted as leveraging the GUI 100 to extract metadata, the video inspector may access the metadata from any number of sources. For example, the video inspector may access metadata through an application programming interface (API) that is provided by the video service site.

The video inspector may then determine whether the extracted metadata violates one or more predefined rules for identifying pirated content. For example, a first rule may specify that one or more metadata attributes (such as the video title 103) include the title 102 (or a portion thereof). For example, if the title 102 is "Disney's Nightly News," and a search result does not include the word "Disney" (but instead reads "nightly news"), then the video inspector may determine that the result is not relevant, and forego processing the search result. Generally, the video inspector may have one or more "positive keywords" (such as the title 102) which must be present in a search result to ensure that each result that is returned as infringing is relevant.

Generally, the video inspector may apply any number of rules to the metadata of the search results. As another example, a second rule may relate to the presence of "negative keywords," which may be used to discard irrelevant attributes. For example, "click here" or "smarturl" may correspond to negative keywords, as these words are typically associated with dummy clickthrough links that do not actually include pirated video content. The video inspector may discard any results which includes negative keywords. As another example, a third rule may relate to whitelisted channels or user accounts, where these channels and accounts are associated with the copyright holder or their licensees. The video inspector may disregard any results associated with these whitelisted channels or user accounts. Conversely, a fourth rule may relate to blacklisted channels or user accounts, where these channels and accounts are associated with known infringers. The video inspector may output these results as being associated with infringing video content. An example output may be a record in a database, a spreadsheet entry, and the like. The output may specify any number of attributes, such as a date the video was identified, the title 102 of the media asset, the video title 103, and the channel title 104.

The video inspector may analyze the metadata of search result 110 in FIG. 1. As shown, the link address includes the title 102 of "nightly news" and a positive keyword of "full episodes." The channel title 104 is associated with a user account under the name of "Jack Sparrow," who may be a known pirate. Based on these metadata attributes, the video inspector may determine that the video associated with search result 110 is pirated. In one embodiment, the video inspector determines that the video is pirated based on a number of rule violations exceeding a threshold. In another embodiment, the video inspector may compute a score for each search result, where the score is based on the metadata and applicable rules. If the score exceeds a score threshold, the video inspector may determine that the video is pirated. The video inspector may generate output for the identified infringing/pirated results. The output may take any suitable format, such as an email, popup notification, database entry, or spreadsheet entry. Table I depicts a row of example output for search result 110:

TABLE I

| Date | Title | Network Address | Channel Address |
| --- | --- | --- | --- |
| May 2, 2015 | Nightly News | http://example.com/v1 | http://example.com/c1 |

A user reviewing the output of the video inspector may easily confirm whether the video is infringing, and request that the video service remove the video for copyright violations.

Furthermore, the video inspector may disregard the search result 120 upon determining that the result 120 includes the clickthrough link 108 as metadata. If a user were to click on search result 120, no infringing content would be found. Therefore, the video inspector disregards search result 120, even though the title 102 and positive keyword "full episodes" are in the video title 103. In one embodiment, the video inspector may be configured to stop processing search results for a given media asset when the number of clickthrough results exceeds a threshold. Further still, the video inspector may disregard search result 130, as the channel title 104 for search result 130 is the whitelisted "Nightly News" channel. This may be a channel associated with the "Nightly News" program, and therefore, the video associated with result 130 does not need to be removed from the video service.

Figure 2:
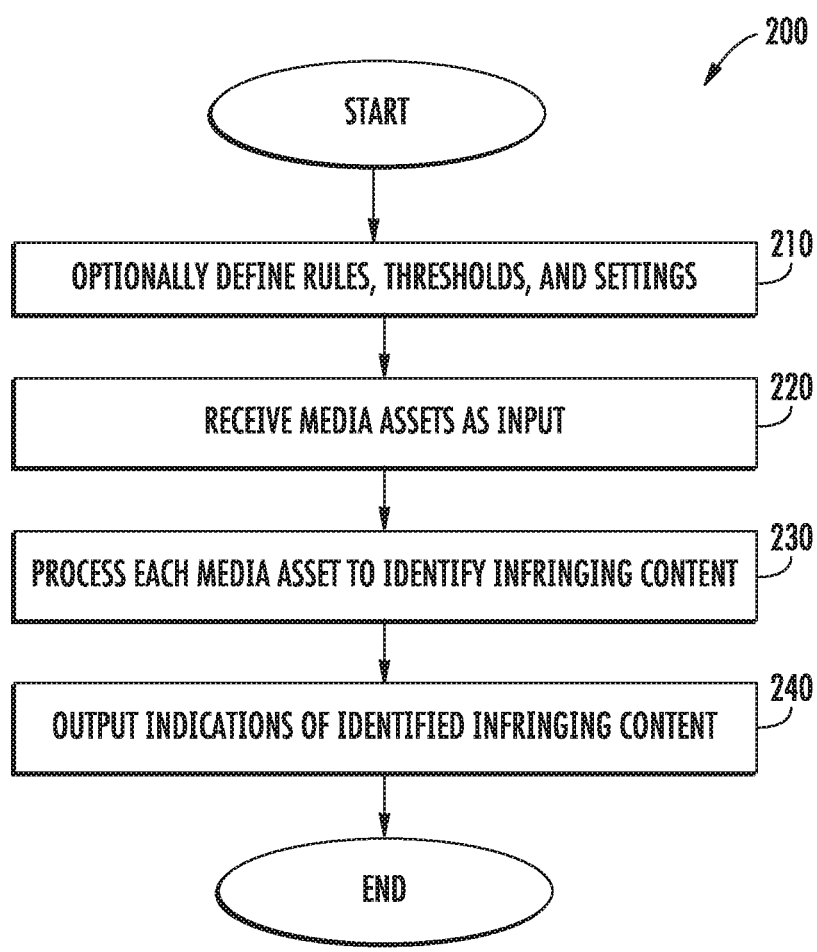
FIG. 2 is a flow chart illustrating a method to inspect videos, according to one embodiment.

FIG. 2 is a flow chart illustrating a method 200 to inspect videos, according to one embodiment. Generally, the video inspector disclosed herein may search any number of different video hosting services to identify pirated content based on the metadata of search result pages. As shown, the method begins at block 210, where a user may optionally define rules, thresholds, and settings for the video inspector. For example, the user may define mandatory rules, which, if violated, result in a video being marked as infringing (and subsequently reported for removal). At step 220, the video inspector may receive media assets as input. Table II depicts example input that may be provided to the video inspector:

TABLE II

| Title | Pages of Search Results | Optional Positive Keywords |
| --- | --- | --- |
| Morning News | 5 | |
| Nightly News | 10 | |
| Talk Show | 5 | |
| Sporting Event | 15 | |
| Disney Cartoon | 5 | Disney |

The video inspector may parse the input to construct a search query, which may be submitted to one or more online video services. As shown, the user may specify a number of pages of search results that the video inspector must examine for infringing content. The user may also specify positive keywords (as well as negative keywords). At block 230, described in greater detail with reference to FIG. 3, the video inspector may process each media asset provided as input to identify infringing content. At step 240, the video inspector may output indications of infringing content.

Figure 3:
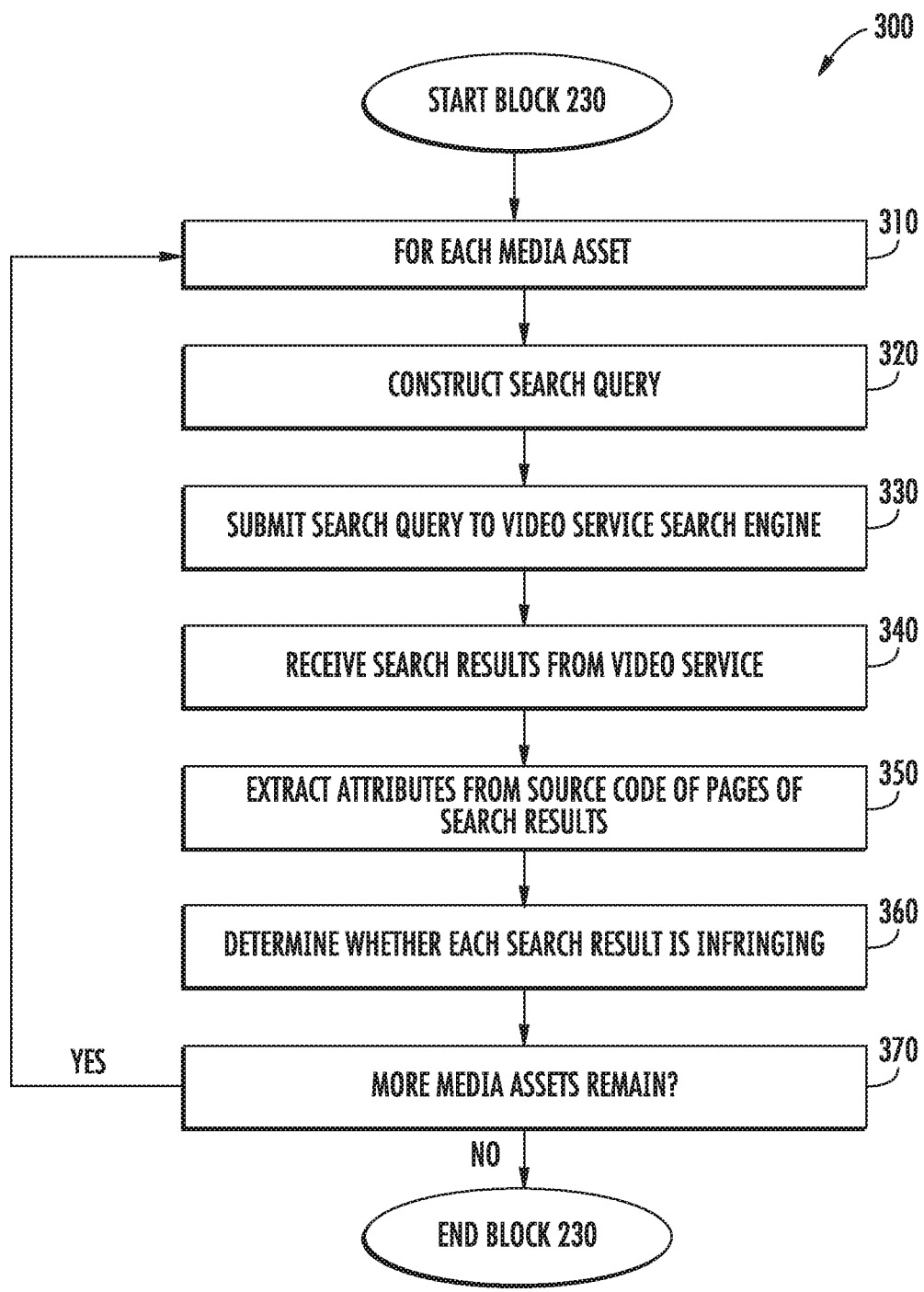
FIG. 3 is a flow chart illustrating a method to process media assets to identify infringing content, according to one embodiment.

FIG. 3 is a flow chart illustrating a method 300 corresponding to block 230 to process media assets to identify infringing content, according to one embodiment. As shown, the method 300 begins at block 310, where the video inspector executes a loop including blocks 320-360 for each media asset provided as input at block 220. At block 320, the video inspector may construct a search query for the current media asset. Generally, the search query may include a title of the media asset and one or more terms associated with piracy, such as "full episodes." At block 330, the video inspector submits the search query to the search engine of a video service. At block 340, the video inspector receives one or more pages of search results from the video service. Although depicted as using the search engine of the video service, as previously indicated, the video inspector may access metadata through APIs provided by the video service. In such embodiments, at block 330, the video inspector may submit the relevant terms as part of an API call to the APIs provided by the video service. At block 340, the video service may return the search results to the video inspector via the APIs.

At block 350, the video inspector may extract attributes from the source code of the pages of search results. For example, the video inspector may extract a title of a video, uniform resource locator (URL) of the video, a title of the channel hosting the video, a URL of the channel, a length of the video, a description of the video, among any other attributes. At block 360, described in greater detail with reference to FIG. 4, the video inspector may determine whether each search result is infringing. At block 370, the video inspector determines whether more media assets remain. If more media assets remain, the video inspector returns to block 310. Otherwise, the method 300 ends.

Figure 4:
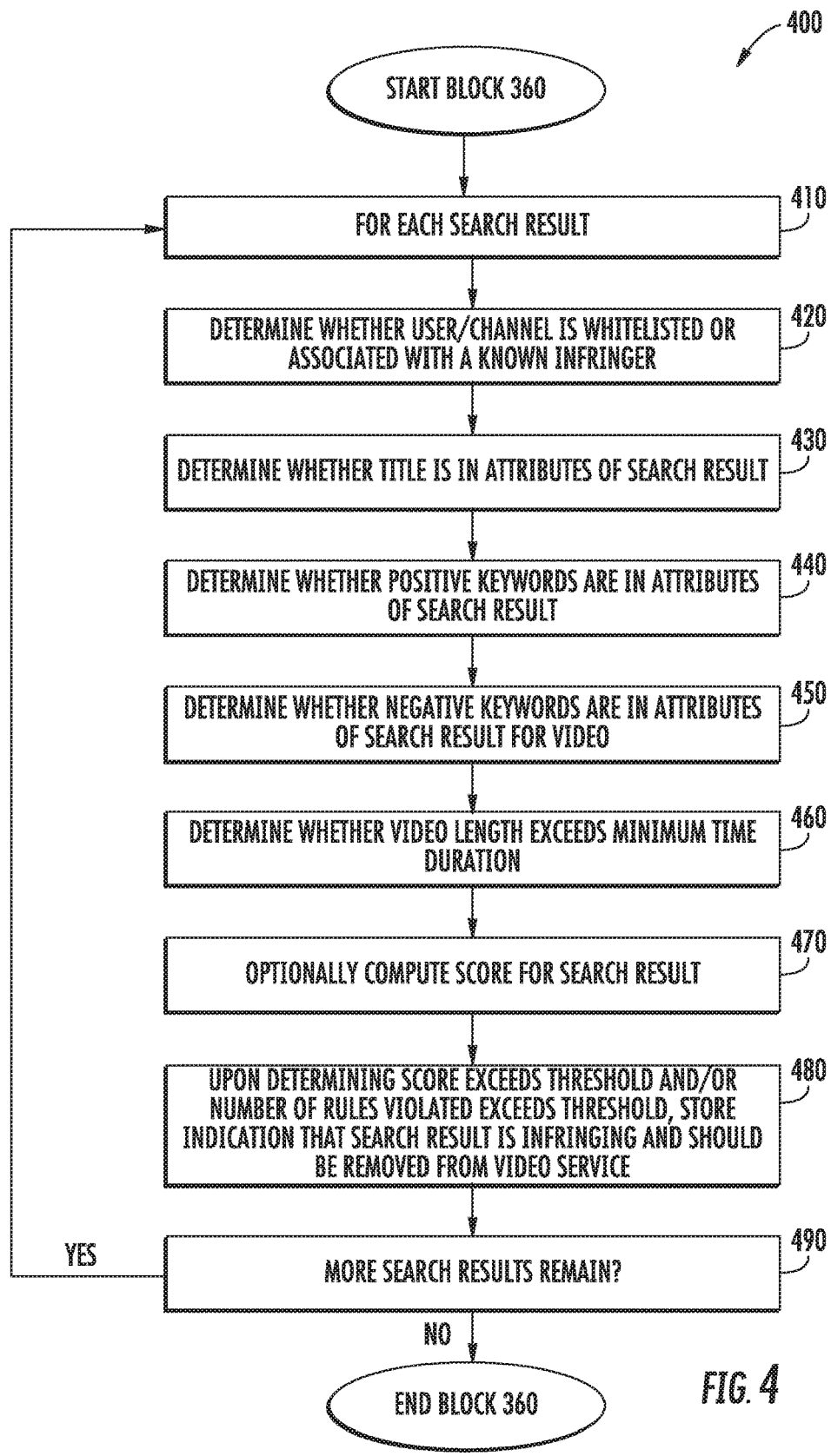
FIG. 4 is a flow chart illustrating a method to determine whether a search result is infringing, according to one embodiment.

FIG. 4 is a flow chart illustrating a method 400 corresponding to block 360 to determine whether a search result is infringing, according to one embodiment. As shown, the method begins at block 410, where the video inspector executes a loop including blocks 420-480 for each search result returned by the video service. At block 420, the video inspector determines whether the user or channel associated with the search result is whitelisted or associated with a known infringer. At block 430, the video inspector determines whether the title of the content is present in the extracted metadata for the search result. If the title of the content is not present (or a key component thereof), the video inspector may determine that the current search result is not an infringing result. At block 440, the video inspector determines whether positive keywords are in the extracted metadata of the search result. If the positive keywords are not in the search result, the video inspector may determine that the search result is not infringing. Similarly, if the positive keyword is in the search result, the video inspector may determine that the result is infringing. Examples of positive keywords include "full episodes," "new release," specific terms in a media asset's title, and the like.

At block 450, the video inspector determines whether negative keywords are in the extracted metadata of the search result. If the negative keywords are not in the search result, the video inspector may determine that the search result is infringing. Similarly, if the negative keyword is in the search result, the video inspector may determine that the result is not infringing. Examples of negative keywords include clickthrough URLs, "watch free," and the like.

At block 460, the video inspector may determine whether the length of the video associated with the current search result exceeds a minimum time threshold. If the length of the video does not exceed the time threshold, the video inspector may disregard (or discard) the search result as not infringing. The time threshold may be used to filter results that are not infringing, and target copying of entire media assets. At block 470, the video inspector may optionally compute a score for the current search result. The score may be based on any suitable algorithm that considers one or more of the determinations made at blocks 420-460. For example, the algorithm may equally weight each determination made at blocks 420-460 to compute a score. At block 480, the video inspector determines whether the computed score exceeds the threshold and/or whether the number of rules violated exceeds a threshold count of rule violations. If so, the video inspector generates and stores an indication that the video corresponding to the search result is infringing and should be removed from the video service. At block 490, the video inspector determines whether more search results remain. If more search results remain, the video inspector returns to block 410. If no more search results remain (or a threshold number of clickthrough results are encountered), the method 400 ends.

Figure 5:
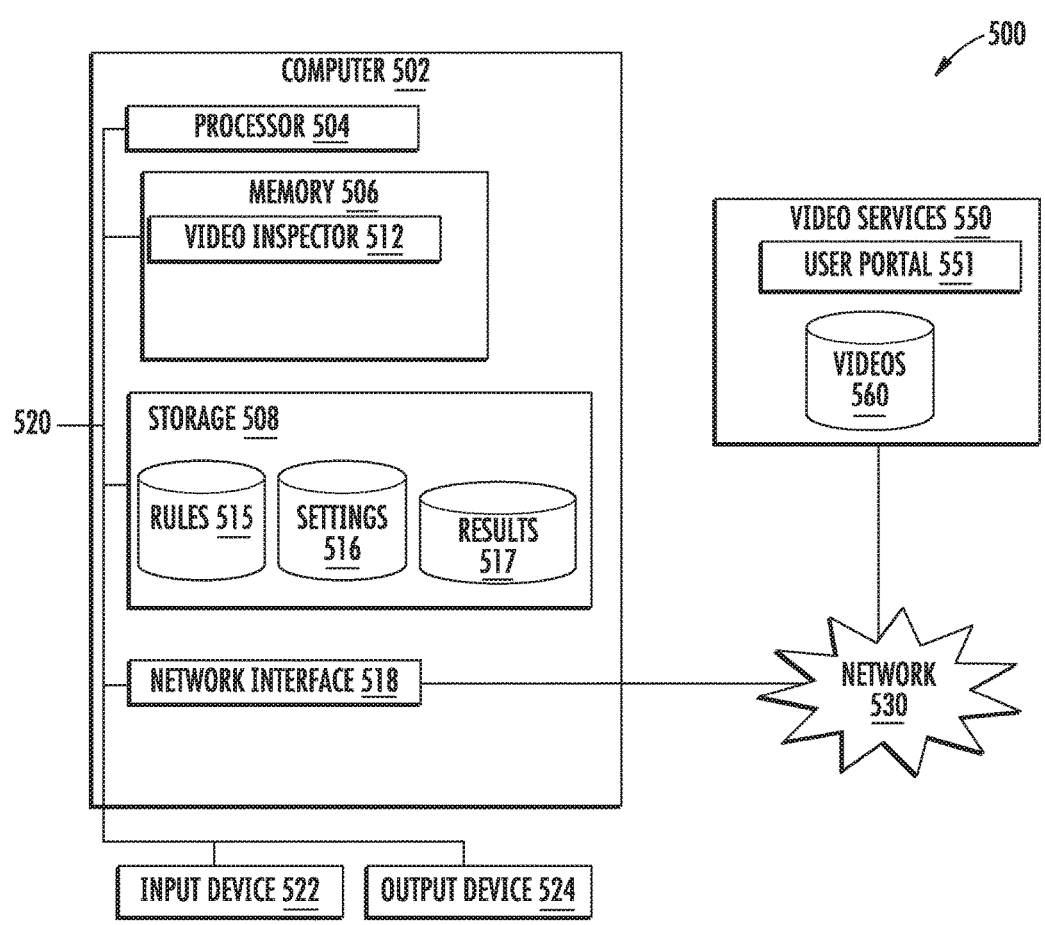
FIG. 5 is a block diagram illustrating a system configured to provide a video inspector, according to one embodiment.

FIG. 5 is a block diagram illustrating a system configured 500 to provide a video inspector, according to one embodiment. The networked system 500 includes a computer 502. The computer 502 may also be connected to other computers via a network 530. In general, the network 530 may be a telecommunications network and/or a wide area network (WAN). In a particular embodiment, the network 530 is the Internet.

The computer 502 generally includes a processor 504 which obtains instructions and data via a bus 520 from a memory 506 and/or a storage 508. The computer 502 may also include one or more network interface devices 518, input devices 522, and output devices 524 connected to the bus 520. The computer 502 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 504 is a programmable logic device that performs instruction, logic, and mathematical processing, and may be representative of one or more CPUs. The network interface device 518 may be any type of network communications device allowing the computer 502 to communicate with other computers via the network 530.

The storage 508 is representative of hard-disk drives, solid state drives, flash memory devices, optical media and the like. Generally, the storage 508 stores application programs and data for use by the computer 502. In addition, the memory 506 and the storage 508 may be considered to include memory physically located elsewhere; for example, on another computer coupled to the computer 502 via the bus 520.

The input device 522 may be any device for providing input to the computer 502. For example, a keyboard and/or a mouse may be used. The input device 522 represents a wide variety of input devices, including keyboards, mice, controllers, and so on. Furthermore, the input device 522 may include a set of buttons, switches or other physical device mechanisms for controlling the computer 502. The output device 524 may include output devices such as monitors, touch screen displays, and so on.

As shown, the memory 506 contains the video inspector 512, which is an application configured to identify infringing videos posted on the video services 550. Generally, the video inspector 512 is configured to provide all functionality described herein.

As shown, the storage 508 contains the rules 515, settings 516, and results 517. The rules 515 include a plurality of rules related to identifying pirated content, such as whitelisted channels/users, blacklisted users/channels (i.e., known infringers), and the like. The settings 516 includes configurable parameters for the video inspector 512, such as thresholds, minimum time durations for videos, keywords, and the like. The results 517 includes output generated by the video inspector 512, such as metadata attributes for users, channels, videos 560, as well as videos 560 that the video inspector 512 has determined to be pirated.

As shown, one or more video services 550 host a plurality of videos 560. Examples of video services 550 include YouTube®, DailyMotion®, and Vimeo®. Users may upload videos 560 via a user portal 551. Users and/or the video inspector 512 may further leverage the user portal 511 to search for videos 560 on the video services 550. The video inspector 512 may construct a query related to a media asset, submit the query via the user portal 551, and analyze the source code of the results page returned by the user portal 551 to extract metadata attributes of each search result. The video inspector 512 may then determine whether the videos corresponding to the search results are pirated based on the rules 515 and settings 516.

Advantageously, embodiments disclosed herein dynamically identify pirated video content on video services. By leveraging metadata returned by video services, embodiments disclosed herein may quickly identify pirated results, while disregarding noisy or legitimate results.

In the foregoing, reference is made to embodiments of the disclosure. However, it should be understood that the disclosure is not limited to specific described embodiments. Instead, any combination of the recited features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the video inspector 512 could execute on a computing system in the cloud and identify pirated videos on online video services. In such a case, the video inspector 512 could store an indication of pirated videos at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   receiving, based on a first search string, a first set of search results including a first search result from a video service, wherein the first search result corresponds to a first video hosted on the video service;
   extracting a set of attributes for the first search result based on source code of the first set of search results, wherein the set of attributes for the first search result comprise: (i) a title of the first video, (ii) a first user account that provides the first video on the video service, (iii) a network address of the first video, and (iv) a description of the first video; and
   upon determining that at least one of the set of attributes for the first search result satisfies a threshold number of rules of a plurality of rules, storing an indication that the first video is a candidate for removal from the video service, wherein the indication comprises: (i) the set of attributes, (ii) a duration of the first video, (iii) a number of views of the first video on the video service, (iv) a name of an asset corresponding to the first video, (v) a date the first video was determined to violate the threshold number of rules, and (vi) a title of a channel on the video service associated with the first user account.

2. The method of claim 1, further comprising:
   evaluating the set of attributes based on the plurality of rules; and
   computing, based on the evaluation, a score for the first video corresponding to the first search result, wherein the indication that the first video is a candidate for removal from the video service is stored upon further determining that the score exceeds a threshold.

3. The method of claim 1, wherein a first rule specifies a set of whitelisted user accounts, wherein the first rule is violated upon determining the first user account is not a member of the set of whitelisted user accounts, wherein a second rule specifies a minimum time duration, wherein the second rule is violated upon determining that the duration of the first video exceeds the minimum time duration of the second rule, wherein a third rule specifies a required keyword, wherein the third rule is violated upon determining that at least one of the title and description of the first video does not include the required keyword, wherein a fourth rule comprises a negative keyword, wherein the fourth rule is violated upon determining that at least one of the title and description of the first video does include the negative keyword.

4. The method of claim 1, wherein a set of attributes are extracted for a threshold number of search results in the first set of search results, wherein the threshold number of search results is based on a title of an asset, wherein the title of the asset is provided by at least one of: (i) a user, and (ii) a file specifying a plurality of asset titles.

5. The method of claim 1, wherein the first set of search results includes a second search result corresponding to a second video hosted by the video service, the method further comprising:
   determining that a second user account associated with the second video is a whitelisted user account; and
   rejecting the second video as a candidate for removal from the video service based on the second user account being a whitelisted user account.

6. The method of claim 1, further comprising:
   generating the first search string based on an asset name and a term; and
   submitting the first search string as a query to the video service.

7. A computer program product, comprising:
   a non-transitory computer-readable storage medium having computer-readable program code embodied therewith, the computer-readable program code executable by one or more processors to perform an operation comprising:
   receiving, based on a first search string, a first set of search results including a first search result from a video service, wherein the first search result corresponds to a first video hosted on the video service;
   extracting a set of attributes for the first search result based on source code of the first set of search results, wherein the set of attributes for the first search result comprise (i) a title of the first video, (ii) a first user account that provides the first video on the video service, (iii) a network address of the first video, and (iv) a description of the first video; and upon determining that at least one of the set of attributes for the first search result satisfies a threshold number of rules of a plurality of rules, storing an indication that the first video is a candidate for removal from the video service, wherein the indication comprises: (i) the set of attributes, (ii) a duration of the first video, (iii) a number of views of the first video on the video service, (iv) a name of an asset corresponding to the first video, (v) a date the first video was determined to violate the threshold number of rules, and (vi) a title of a channel on the video service associated with the first user account.

8. The computer program product of claim 7, the operation further comprising:
evaluating the set of attributes based on the plurality of rules; and
computing, based on the evaluation, a score for the first video corresponding to the first search result, wherein the indication that the first video is a candidate for removal from the video service is stored upon further determining that the score exceeds a threshold.

9. The computer program product of claim 7, wherein a first rule specifies a set of whitelisted user accounts, wherein the first rule is violated upon determining the first user account is not a member of the set of whitelisted user accounts, wherein a second rule specifies a minimum time duration, wherein the second rule is violated upon determining that the duration of the first video exceeds the minimum time duration of the second rule, wherein a third rule specifies a required keyword, wherein the third rule is violated upon determining that at least one of the title and description of the first video does not include the required keyword, wherein a fourth rule comprises a negative keyword, wherein the fourth rule is violated upon determining that at least one of the title and description of the first video does include the negative keyword.

10. The computer program product of claim 7, wherein a set of attributes are extracted for a threshold number of search results in the first set of search results, wherein the threshold number of search results is based on a title of an asset, wherein the title of the asset is provided by at least one of: (i) a user, and (ii) a file specifying a plurality of asset titles.

11. The computer program product of claim 7, wherein the first set of search results includes a second search result corresponding to a second video hosted by the video service, the operation further comprising:
determining that a second user account associated with the second video is a whitelisted user account; and
rejecting the second video as a candidate for removal from the video service based on the second user account being a whitelisted user account.

12. The computer program product of claim 7, the operation further comprising:
generating the first search string based on an asset name and a term; and
submitting the first search string as a query to the video service.

13. A system, comprising:
a processor; and
a memory containing a program, which when executed by the processor, performs an operation comprising:
receiving, based on a first search string, a first set of search results including a first search result from a video service, wherein the first search result corresponds to a first video hosted on the video service;
extracting a set of attributes for the first search result based on source code of the first set of search results, wherein the set of attributes for the first search result comprise: (i) a title of the first video, (ii) a first user account that provides the first video on the video service, (iii) a network address of the first video, and (iv) a description of the first video; and
upon determining that at least one of the set of attributes for the first search result satisfies a threshold number of rules of a plurality of rules, storing an indication that the first video is a candidate for removal from the video service, wherein the indication comprises: (i) the set of attributes, (ii) a duration of the first video, (iii) a number of views of the first video on the video service, (iv) a name of an asset corresponding to the first video, (v) a date the first video was determined to violate the threshold number of rules, and (vi) a title of a channel on the video service associated with the first user account.

14. The system of claim 13, the operation further comprising:
evaluating the set of attributes based on the plurality of rules; and
computing, based on the evaluation, a score for the first video corresponding to the first search result, wherein the indication that the first video is a candidate for removal from the video service is stored upon further determining that the score exceeds a threshold.

15. The system of claim 13, wherein a first rule specifies a set of whitelisted user accounts, wherein the first rule is violated upon determining the first user account is not a member of the set of whitelisted user accounts, wherein a second rule specifies a minimum time duration, wherein the second rule is violated upon determining that the duration of the first video exceeds the minimum time duration of the second rule, wherein a third rule specifies a required keyword, wherein the third rule is violated upon determining that at least one of the title and description of the first video does not include the required keyword, wherein a fourth rule comprises a negative keyword, wherein the fourth rule is violated upon determining that at least one of the title and description of the first video does include the negative keyword.

16. The system of claim 13, wherein a set of attributes are extracted for a threshold number of search results in the first set of search results, wherein the threshold number of search results is based on a title of an asset, wherein the title of the asset is provided by at least one of: (i) a user, and (ii) a file specifying a plurality of asset titles.

17. The system of claim 13, wherein the first set of search results includes a second search result corresponding to a second video hosted by the video service, the operation further comprising:
determining that a second user account associated with the second video is a whitelisted user account; and
rejecting the second video as a candidate for removal from the video service based on the second user account being a whitelisted user account.

* * * * *